US012090726B2

(12) United States Patent
Draghetti

(10) Patent No.: US 12,090,726 B2
(45) Date of Patent: Sep. 17, 2024

(54) MACHINE AND METHOD FOR THE AUTOMATED PRODUCTION OF STRAWS

(71) Applicant: I.M.A. INDUSTRIA MACCHINE AUTOMATICHE S.P.A., Ozzano dell'Emila (IT)

(72) Inventor: Fiorenzo Draghetti, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 39 days.

(21) Appl. No.: 18/009,405

(22) PCT Filed: Jun. 10, 2021

(86) PCT No.: PCT/IT2021/050182

§ 371 (c)(1),
(2) Date: Dec. 9, 2022

(87) PCT Pub. No.: WO2021/250718

PCT Pub. Date: Dec. 16, 2021

(65) Prior Publication Data

US 2023/0256701 A1 Aug. 17, 2023

(30) Foreign Application Priority Data

Jun. 10, 2020 (IT) ........................ 102020000013822

(51) Int. Cl.
*B31D 5/00* (2017.01)
*B26D 3/16* (2006.01)
(Continued)

(52) U.S. Cl.
CPC ........... *B31D 5/0095* (2013.01); *B26D 3/162* (2013.01); *B31F 1/0032* (2013.01); *B31F 1/205* (2013.01); *B65B 19/34* (2013.01)

(58) Field of Classification Search
CPC ..... B31D 5/0095; B26D 3/162; B31F 1/0032; B31F 1/205; B65B 19/34; B65B 9/02
(Continued)

(56) References Cited

U.S. PATENT DOCUMENTS 1,481,866 A * 1/1924 Heist ........................ B29C 65/18 156/445
1,980,173 A * 11/1934 Bauer ...................... B31C 11/02 493/302
(Continued)

FOREIGN PATENT DOCUMENTS

JP S5777401 A 5/1982
JP H10100097 A * 4/1998
KR 20030034361 A 5/2003

OTHER PUBLICATIONS

International Search Report and Written Opinion for PCT Patent Application No. PCT/IT2021/050182 dated Sep. 17, 2021, 14 pages.

*Primary Examiner* — Thomas M Wittenschlaeger
*Assistant Examiner* — Katie L Gerth
(74) *Attorney, Agent, or Firm* — MCANDREWS HELD & MALLOY, LTD

(57) ABSTRACT

Machine (10) to produce straws (11), preferably made of paper, comprising a feed unit (16) configured to feed a plurality of tubular elements, preferably made of paper, to different working units (17, 19, 20, 21) configured to automatically carry out different workings on the tubular elements (12), including at least one cut to make a pointed end (13), or an end cut obliquely, a deformation to make a bellows (14), a bend in correspondence with the bellows (14) and the packaging of each straw (11).

16 Claims, 3 Drawing Sheets

(51) Int. Cl.
*B31F 1/00* (2006.01)
*B31F 1/20* (2006.01)
*B65B 19/34* (2006.01)

(58) Field of Classification Search
USPC .......................................................... 493/290
See application file for complete search history.

(56) References Cited

U.S. PATENT DOCUMENTS 2,094,268 A * 9/1937 Friedman ................ B29C 53/30 215/388
2,128,564 A * 8/1938 Schoen ..................... B31C 3/00 493/280
2,550,797 A * 5/1951 Friedman ................ B29C 53/30 239/33
2,631,645 A * 3/1953 Friedman ............... B21D 15/06 29/890.047
2,985,077 A * 5/1961 Strahammer ........... B29C 53/30 493/463
3,012,604 A * 12/1961 Zieg ........................ B31F 1/205 72/402
3,038,282 A * 6/1962 Hansen ..................... A61J 3/07 222/254
3,122,977 A * 3/1964 Graham ............... B31D 5/0095 493/451
3,242,828 A * 3/1966 Larkin ................. B31D 5/0095 493/287
3,477,191 A * 11/1969 Davis ...................... B65B 19/34 53/550
3,641,884 A * 2/1972 Jivoin ..................... B29C 53/30 264/296
3,659,507 A * 5/1972 Cushman ............. B31D 5/0095 493/454
3,751,541 A * 8/1973 Hegler ................ B29C 49/0021 425/303
3,844,700 A * 10/1974 Sokolow ............... B29B 13/024 425/529
3,851,441 A * 12/1974 Marchand ............... B65B 9/042 53/239
4,093,496 A * 6/1978 Molins ................. A24D 3/0287 493/46
4,134,247 A * 1/1979 Sather ................... B65B 61/205 426/115
4,384,441 A * 5/1983 Maruyama ................ B65B 9/04 53/553
4,494,361 A * 1/1985 Barathon .................. B65B 9/02 53/553
4,604,852 A * 8/1986 Becker .................... B65B 19/34 53/553
4,613,474 A * 9/1986 Donati .................. B29C 59/021 198/803.12
4,903,458 A * 2/1990 Hakansson ............ B65D 77/28 53/410
5,019,028 A * 5/1991 Engel ........................ B26F 1/26 83/16
5,265,398 A * 11/1993 VanAlstine ............. B65B 19/34 53/500
6,346,211 B1 * 2/2002 Rafferty ................ B29C 53/083 264/339
10,524,599 B1 * 1/2020 O'Neill ................ B31D 5/0095
11,117,343 B2 * 9/2021 Schultz .................... B26D 3/16
2001/0002532 A1 * 6/2001 Murphy ................ B65B 61/205 53/445
2003/0001002 A1 * 1/2003 Haughton ............. B65B 61/186 229/103.1
2006/0026930 A1 * 2/2006 Grishchenko ........... B65B 19/34 53/550
2019/0069701 A1 * 3/2019 O'Neill ................... B31F 1/205
2021/0046724 A1 * 2/2021 Schultz .................... B26D 1/36
2023/0145726 A1 * 5/2023 Salomäki ............. A47G 21/186 493/288
2023/0226794 A1 * 7/2023 Tale ..................... B31D 5/0095 493/465

* cited by examiner

MACHINE AND METHOD FOR THE AUTOMATED PRODUCTION OF STRAWS

CROSS-REFERENCE TO RELATED APPLICATIONS

The present application is a National Phase Entry of PCT International Application No. PCT/IT2021/050182, which was filed on Jun. 10, 2021, which claims priority to Italian patent application No. 102020000013822, filed Jun. 10, 2020, both of which are hereby incorporated by reference in their entireties.

FIELD OF APPLICATION

The present invention relates to a machine and a method for the automated production of straws, preferably made of paper, for example to be used to drink a liquid, or semi-liquid. In particular, the machine and the method according to the present invention are capable of producing special straws for the food sector of beverage containers, such as fruit juices, or other, hermetically sealed, usually small, with a capacity around 100-200 ml, and are provided with a perforable area. Each of such straws can preferably be provided with a pointed, or obliquely cut, end to facilitate its insertion into the aforementioned perforable area, as well as optionally a flexible area, which allows it to be bent, repeatably, for packaging without damaging it.

BACKGROUND ART

The use of straws for drinking dates back thousands of years, although their diffusion has become massive starting in the last century, due to the use of straw material and the industrialization of their production.

Before the advent and enormous use of plastic materials, with which drinking straws are still produced, there was a period during which straws were produced with paper, although the production with the latter material created problems of cost, consistency, rigidity, creasing or collapse of the straws.

In an attempt to reduce environmental pollution, many countries aim to limit, if not even eliminate, where possible, the use of plastic materials, so there is now a strong need to return to producing straws, including drinking straws, using paper as the raw material.

A particular sector of drinking straws is that of small straws to be associated individually with hermetically sealed beverage containers, such as fruit juices or the like, also known as boxes, normally small in size, with a capacity around 100-200 ml, provided with a perforable area to facilitate the insertion of the straw.

Each of such straws is normally provided with a pointed end, for example with an oblique cut with respect to its longitudinal axis, to facilitate its insertion into the aforementioned perforable area of the closed container.

Such special straws are normally provided with a flexible area, for example bellows, which allows the cartridge itself to be folded in two, even repeatably, without damaging it. Examples of such straws are described in international patent application WO 2020/178873 filed by the Applicant.

Furthermore, for food hygiene and safety, each of such drinking straws is normally placed in its own sealed casing, as described for example in patent application GB 2,249,017 A.

Machines and methods for the automated production of tubular products folded and packaged inside a plastic casing are for example described in CN 2,403,682 Y.

Machines and methods for the automated production of tubular products using paper as a raw material, from which to obtain drinking straws, are also known.

The known machines and the related methods to produce the particular paper straws for drinking, which are also provided with a pointed, or obliquely cut, end and a flexible area, however, all have the drawback of being very expensive and bulky, so much so that sometimes they are a few tens of meters long, because the various working steps are carried out separately.

Moreover, they have the drawback of having a relatively low hourly production capacity, for which the single piece produced is quite expensive.

An object of the present invention is to make a machine and to develop a method for the automated production of straws, preferably made of paper, such that they can automatically make a flexible area on each straw, for example in an intermediate part between the two ends, and in which the machine is simple, compact, reliable, inexpensive, which can work continuously and requires little maintenance, and in which all the working steps are simple and reliable and allow to obtain a high hourly productivity, around over 1,000 straws per minute.

Another object of the present invention is to make a machine and to develop a method for the automated production of straws, preferably made of paper, such that they can automatically make, on each straw, an oblique cut at one end thereof.

A further object of the present invention is to make a machine and to develop a method for the automated production of straws, preferably made of paper, such that they can automatically make, on each straw, a bending, up to 180°, in correspondence with the aforementioned flexible area, to reduce the overall length of the straw itself.

A further object of the present invention is to make a machine and to develop a method for the automated production of straws, preferably made of paper, which are also able to automatically and hermetically wrap each straw on its own protective casing, after the straw itself has been shaped and made flexible in an intermediate area thereof, and/or bent up to 180° to reduce its dimension in length.

The Applicant has studied, tested and realized the present invention to overcome the drawbacks of the prior art and to obtain these and further objects and advantages.

EXPOSURE OF THE INVENTION

The present invention is expressed and characterized in the independent claims. The dependent claims show other features of the present invention or variants of the main solution idea.

In accordance with the aforementioned objects, a machine for the automated production of straws, preferably made of paper, according to the present invention comprises at least one feed unit configured to automatically feed a plurality of tubular elements, preferably made of paper, to a plurality of working units configured to carry out corresponding workings on each of the tubular elements, to make the straws.

In accordance with a characteristic aspect of the present invention, the plurality of working units comprises:

(i) a deformation unit, configured to make at least one bellows on each of said tubular elements so that said bellows is present in each straw;

(ii) a bending unit, configured to carry out at least one bend on each of said tubular elements, preferably in correspondence with said bellows, so as to reduce the overall length of each straw;

(iii) a packaging unit, configured to package each straw in a material suitable for each straw to be hermetically sealed for hygienic protection before its use.

In accordance with another characteristic aspect of the present invention, the aforementioned deformation unit, the aforementioned bending unit and the aforementioned packaging unit are disposed in sequence and preferably without a break in continuity with respect to an advancement direction of the tubular elements, so that the packaging of the folded straws occurs without interruption after the deformation unit has made the bellows and the bending unit has carried out the bend in correspondence with the aforementioned bellows.

In accordance with another characteristic aspect of the present invention, the deformation unit, the bending unit, and the packaging unit each comprise a cylindrical member. The cylindrical members are each rotating around a respective axis of rotation, all at the same peripheral speed. The aforementioned working units are disposed such that the cylindrical members are tangent to each other. Each cylindrical member has a peripheral surface provided with straw retaining means suitable to support and temporarily retain the straws being formed, disposed parallel to the axis of rotation, and angularly equidistant, from the adjacent straw, by a determinate pitch.

In accordance with another characteristic aspect of the present invention, between the aforementioned feed unit and the aforementioned one or more working units there is a distancing unit configured to distance the aforementioned tubular elements from each other and bring them to a determinate constant pitch each one from the other.

In accordance with another characteristic aspect of the present invention, the aforementioned one feed unit comprises feed means configured to convey the aforementioned plurality of tubular elements, also initially disposed haphazardly, toward a first cylindrical member rotating around a first axis of rotation thereof and provided with one or more peripheral seatings parallel to the aforementioned first axis of rotation, each of which is configured to temporarily receive and retain one of the aforementioned tubular elements. It should be noted that in the following description and in the claims, cylindrical member means a mechanical member, even complex, which as a whole has substantially the shape of a cylinder.

In accordance with another characteristic aspect of the present invention, the aforementioned feed means comprise at least one conveyor belt having a terminal portion disposed in the proximity of a distributor member configured to vertically stack one on the other the aforementioned tubular elements coming from the aforementioned conveyor belt to then exit, one at a time, toward the aforementioned first rotating cylindrical member.

In accordance with another characteristic aspect of the present invention, a cutting unit is provided, configured to cut each of the aforementioned tubular elements so as to make a pointed, or obliquely cut, end on each straw. In accordance with a possible embodiment, the cutting unit is associated with the aforementioned first cylindrical member rotating around the first axis of rotation, which receives the tubular elements from the feed unit and temporarily retains them in the seatings obtained thereon. It is to be understood that in other embodiments, which will be completely apparent to the person skilled in the art, the cutting unit can also be operatively associated with another working unit of the machine, such as to one or the other of the distancing, deformation, bending, or packaging units. In the case where the cutting unit is operatively associated with the packaging unit, it is evident that the cutting is carried out before the packaging of the straws.

In accordance with possible embodiments, the aforementioned cutting unit comprises a circular blade rotating around an axis of rotation thereof and configured to obliquely cut the aforementioned tubular elements; furthermore, the aforementioned axis of rotation of the aforementioned circular blade and the aforementioned axis of rotation of the aforementioned first cylindrical member form a determinate angle between them, preferably between 30° and 60°, even more preferably of 45°.

In accordance with another characteristic aspect of the present invention, the aforementioned packaging unit comprises another cylindrical member rotating around an axis of rotation thereof; furthermore, a first thin film of the aforementioned suitable material is configured to be partially wrapped on the aforementioned further cylindrical member; the aforementioned first thin film partially wrapped on the aforementioned further cylindrical member is configured to receive the straws; a second thin film of the aforementioned suitable material is configured to be disposed on the straws, so that the latter are sandwiched between the aforementioned two thin films.

In accordance with another characteristic aspect of the present invention, the aforementioned packaging unit further comprises first heat-welding means, configured to weld together the aforementioned two thin films in a direction transverse to their advance toward a support member disposed downstream of the aforementioned another cylindrical member, and second heat-welding means, configured to weld the aforementioned two thin films together in a longitudinal direction, i.e., parallel to their advance toward the aforementioned support member.

In accordance with a further characteristic aspect of the present invention, a method to produce straws, preferably made of paper, comprises a feed step in which a plurality of tubular elements, preferably made of paper, are fed to a plurality of working units configured to carry out corresponding workings on each of the aforementioned tubular elements, to make the straws, in which the aforementioned plurality of working units allow to carry out, in sequence, and without a break in continuity, the following working steps:

(i) a deformation step, during which at least one bellows is made on each of said tubular elements so that the aforementioned bellows is present in each straw;

(ii) a bending step, during which at least one bend is carried out on each of said tubular elements, preferably in correspondence with said bellows, so as to reduce the overall length of each straw;

(iii) a packaging step, during which each straw is packaged in a suitable material so that each straw is hermetically sealed to be hygienically protected before its use.

Such deformation, bending and packaging steps occur one after the other without interruption while the tubular elements advance along an advancement direction.

In accordance with a further characteristic aspect of the present invention, in the aforementioned method said deformation step, said bending step and said packaging step occur in sequence and preferably without a break in continuity.

In accordance with a further characteristic aspect of the present invention, between the aforementioned feed step and the aforementioned at least one working step there is optionally a distancing step to distance the aforementioned tubular elements from each other and bring them to a determinate constant pitch each one from the other.

In accordance with a further characteristic aspect of the present invention, during the deformation step, the bending step and the packaging step, the straws in the forming step are retained by retaining means suitable to support and temporarily retain the straws, angularly equidistant from one another with respect to the adjacent one by the aforementioned determinate pitch.

In accordance with a further characteristic aspect of the present invention, between the aforementioned feed step and the aforementioned at least one working step a cutting step is provided, during which each of the aforementioned tubular elements is cut to create a pointed, or obliquely cut, end on each straw. The cutting step can occur before or after the deformation step, or before or after the bending step, or before the packaging step.

ILLUSTRATION OF THE DRAWINGS

These and other aspects, features and advantages of the present invention will become clear from the following embodiment description, given as a non-limiting example, with reference to the attached drawings in which.

It should be noted that in the present description and in the claims, the terms vertical, horizontal, lower, upper, right, left, high, low, front and rear, with their variations, have the sole function of better illustrating the present invention with reference to the figures of the drawings and must not be used in any way to limit the scope of the invention itself, or the scope of protection defined by the appended claims. For example, the term vertical is meant to indicate an axis, or a plane, which can be either perpendicular to the horizon line or inclined, even by several degrees, for example up to 20°, with respect to such a perpendicular position.

Furthermore, those skilled in the art will recognize that certain dimensions, or features, in the figures may have been enlarged, deformed, or shown in an unconventional, or non-proportional manner to provide a version of the present invention which is easier to understand. When dimensions and/or values are specified in the following description, the dimensions and/or values are provided for illustrative purposes only and are not to be construed as limiting the scope of protection of the present invention, unless such dimensions and/or values are present in the appended claims.

DESCRIPTION OF EMBODIMENTS OF THE PRESENT INVENTION

An example of embodiments of the invention is now described, which refer to the accompanying figures. Such embodiment examples are provided as an illustration of the invention and are not intended as a limitation thereof. It is understood that the scope of protection of the present invention will be inclusive of any modifications and variations. Furthermore, it is clarified that the phraseology and terminology used herein is for only descriptive purposes and should not be considered as limiting the scope of protection of the present invention.

Figure 1:
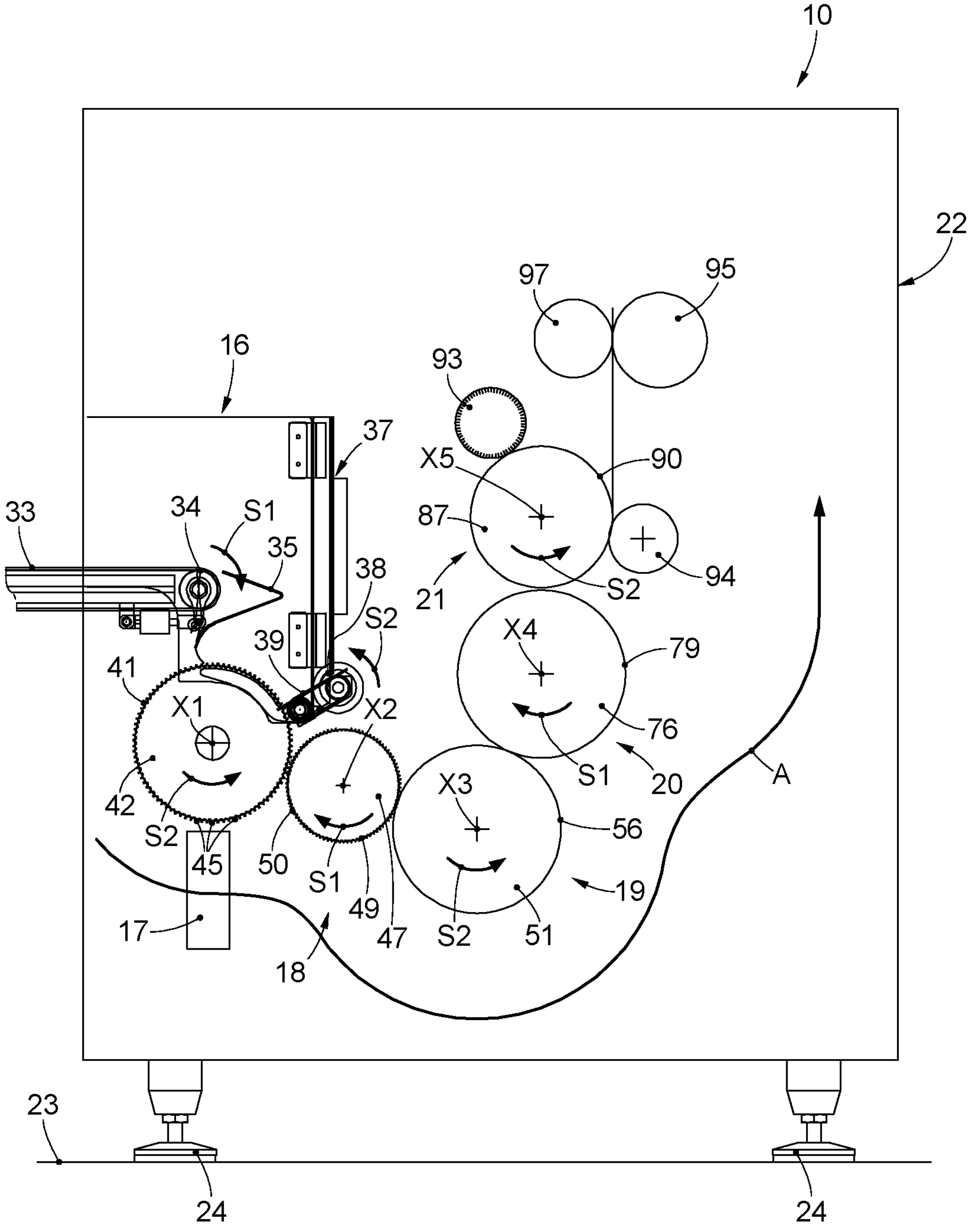
FIG. 1 is a schematic front view of a machine for the automated production of straws according to the present invention, in a first embodiment.
Figure 2:
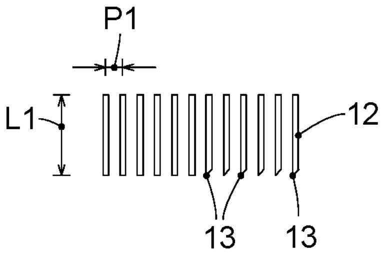
FIG. 2 is a schematic view of some tubular elements used to produce straws by the machine of FIG. 1, distanced from each other by a first pitch P1, in which a sequence of an oblique cut in correspondence with one end of each thereof is also shown.
Figure 3:
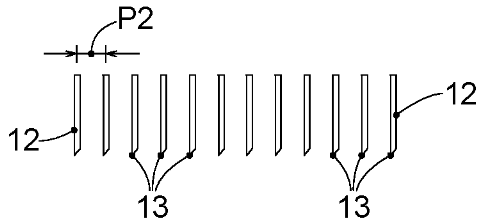
FIG. 3 is a schematic view of the tubular elements of FIG. 2, but distanced from each other by a second pitch P2>P1.

FIG. 1 depicts a schematic diagram of a first embodiment of a machine 10 for the automated production of straws 11 (FIGS. 5 and 6), preferably made of paper, according to the present invention, which occurs starting from tubular elements 12 (FIG. 2) already made, for example using a known machine, or which will be developed in the future.

Merely by way of illustration and in order to better frame one of the possible fields of application of the present invention, each tubular element 12 can have an external diameter between about 2 mm and about 20 mm, preferably between about 4 mm and about 10 mm, a thickness of the tubular wall between about 0.2 mm and about 0.5 mm, and a length L1 between about 50 mm and about 200 mm.

Figure 4:
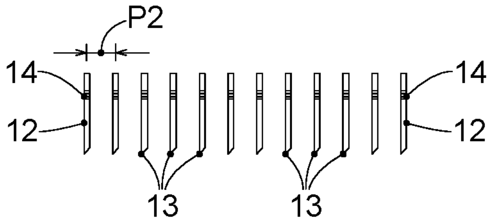
FIG. 4 is a schematic view of the tubular elements of FIG. 2, in which a respective bellows has been made on each thereof.

To make the straws 11, each tubular element 12 is first cut to make at least one pointed or obliquely cut end 13 (FIGS. 2 to 5) and then shaped to form at least one bellows 14 thereon (FIG. 4), preferably in the proximity of one terminal end thereof.

Figure 5:
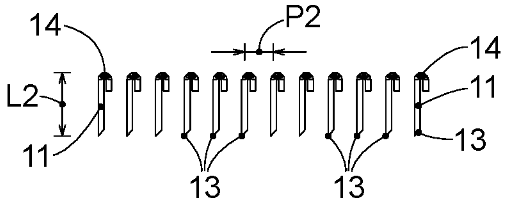
FIG. 5 is a schematic view of the straws of FIG. 4, on each of which a bend has been made in correspondence with the bellows.
Figure 6:
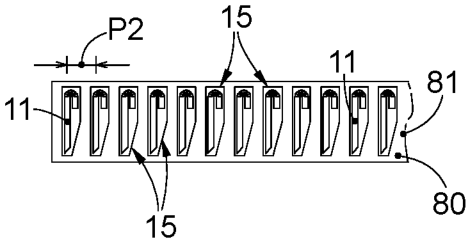
FIG. 6 is a schematic view of the straws of FIG. 5 packaged individually.

Each straw 11 is then folded in correspondence with the bellows 14 thereof (FIG. 5), for example by about 180°, to reduce the overall length thereof, and at the end it is individually packaged, each in its own sealed casing 15 (FIG. 6).

In the embodiments disclosed herein, the machine 10 (FIGS. 1 and 7) comprises, in summary and sequence, the following working units, each of which is configured to automatically carry out a corresponding working step, as will be described in detail below: a feed unit 16, a cutting unit 17, a distancing unit 18, a deformation unit 19, a bending unit 20, and a packaging unit 21.

In a simplified version of the machine 10, not depicted herein, but easily understood by those skilled in the art, the distancing unit 18 could be eliminated, as will be explained further below.

All five working units 16, 17, 18, 19, 20 and 21 are mounted on a support structure 22, which is configured to be supported on a horizontal plane 23, for example consisting of a floor, by means of the support feet 24 thereof.

All five working units 16, 17, 18, 19, 20 and 21 are controlled by a central control unit 29 (FIG. 7) contained in a control panel 30 disposed at the top of the support structure 22, so as to be easily accessible by an operator.

In detail, the feed unit 16 (on the left in FIGS. 1 and 7), comprises a substantially horizontal conveyor belt 33; a chute 35 is positioned in correspondence with a terminal portion 34 thereof. The rotation of the conveyor belt 33 in a first rotation direction S1, for example clockwise if viewed from the front of the machine 10, is controlled by a motor element of a known type, or which will be developed in the future, for example an electric motor, not depicted in the drawings, which is controlled by the central control unit 29.

The conveyor belt 33 is configured to feed a plurality of tubular elements 12 (FIG. 2), disposed thereon also haphazardly, or randomly, toward a distributor member 37 (FIGS. 1 and 7) disposed near the chute 35.

The distributor member 37 is configured to vertically stack one on top of the other the tubular elements 12 coming from the conveyor belt 33 so that they then exit, one at a time, from a lower end 38 thereof toward an underlying conveyor belt 39, inclined downwards and rotatable, on corresponding pulleys, in a second rotation direction S2, opposite the first rotation direction S1, by a motor member of a known type, or which will be developed in the future, for example an electric motor, not depicted in the drawings, which is also controlled by the central control unit 29.

The conveyor belt 39 has a lower terminal part thereof close to a peripheral surface 41 of a first cylindrical member 42, also rotatable in the second rotation direction S2, around a first axis of rotation X1, substantially horizontal.

The first cylindrical member 42 is rotated by a motor member of a known type, or which will be developed in the future, for example an electric motor, not depicted in the drawings, which is also controlled by the central control unit 29 so that the first cylindrical member 42 has a determinate first peripheral speed V1, which is chosen as a function of the productivity of the machine 10 to be obtained, understood as the number of straws 11 produced in the time unit, which, indicatively, in the machine 10 of the present embodiment, is over 1,000 per minute.

In particular, in the example provided herein, the peripheral surface 41 of the first cylindrical member 42 is provided with a plurality of semicylindrical seatings 45, open outwardly, parallel to the first axis of rotation X1 and uniformly angularly distanced by a determinate first pitch P1 (FIG. 2), which for example is slightly larger than the external diameter of each tubular element 12.

The semicylindrical seatings 45 are configured to temporarily and individually receive the tubular elements 12 coming from the conveyor belt 39, while the first cylindrical member 42 is rotating. The tubular elements 12 can each be retained within a respective retaining seating 45 in any mode well known to the person skilled in the art, for example simply by mechanical interference between the tubular elements 12 and the retaining seatings 45. It should be understood that in other embodiments, different retaining modes can be provided, for example mechanical, by means of the presence of gripping members actuated to alternatively grasp or release the tubular elements, or pneumatic, by means of a pneumatic circuit which retains the tubular elements 12 by suction within the retaining seatings 45.

The cutting unit 17 is disposed near the first cylindrical member 42 and is configured to carry out an oblique cut, with respect to the longitudinal axis of each tubular element 12, in correspondence with one end of the latter (FIG. 2) to make the obliquely cut pointed end 13 on each straw 11 in the forming step.

The cutting unit 17 comprises a circular blade 60 (FIG. 7), having an axis of rotation thereof which is inclined at a certain angle with respect to the fourth axis of rotation X4, preferably between 30° and 60°, still more preferably 45°, and rotatable by an electric motor 61, also controlled by the central control unit 29. The position in space of the cutting profile of the circular blade 60 is such as to interfere with the tubular elements 12 retained in the semicylindrical seatings 45 made on the peripheral surface 41 (FIGS. 1 and 7) of the first cylindrical member 42. The cutting unit 17, for example, is disposed substantially on the opposite side with respect to the distributor member 37.

The rotation of the first cylindrical member 42 causes each tubular element 12 to be brought under the sharp profile of the circular blade 60, which makes a precise and oblique cut with respect to the longitudinal axis of the same tubular element 12.

Figure 7:
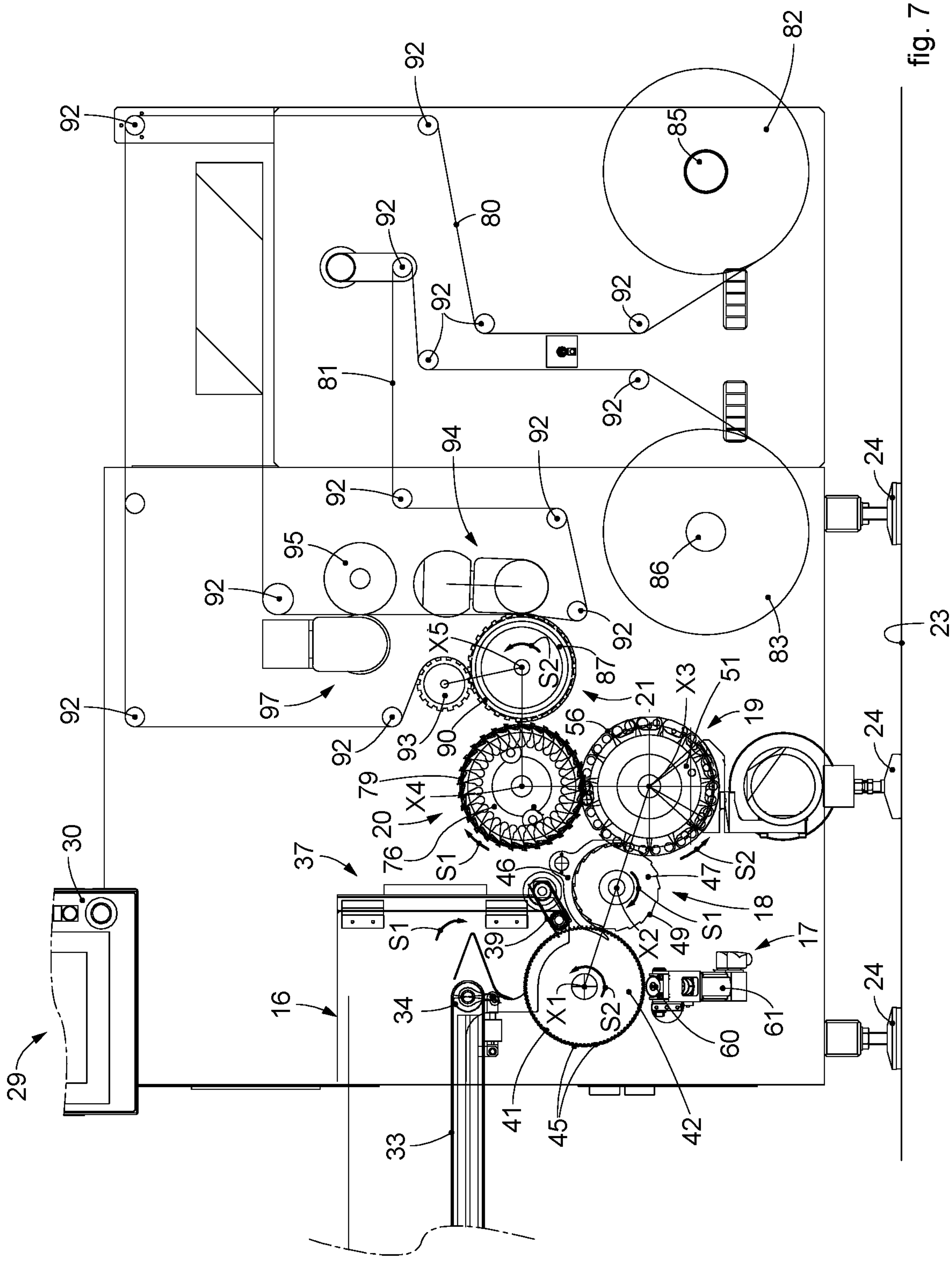
FIG. 7 is a schematic front view of a machine for the automated production of straws according to the present invention, in a second embodiment.

The distancing unit 18 is placed immediately downstream of the feed unit 16 and comprises a second cylindrical member 47 rotatable in the first rotation direction S1, i.e., opposite that of the first cylindrical member 42, around a second axis of rotation X2, also substantially horizontal and rotated by a motor member of a known type, or which will be developed in the future, for example an electric motor, not depicted in the drawings, which is also controlled by the central control unit 29 (FIG. 7).

The second cylindrical member 47 (FIGS. 1 and 7) has a peripheral surface 49 substantially tangent to the surface 41 of the first cylindrical member 42 and provided with a plurality of semicylindrical seatings 50, parallel to the second axis of rotation X2 and in particular equal to the semicylindrical seatings 45 of the first cylindrical member 42, but angularly distanced from each other by a determinate second pitch P2 (FIG. 3) which is approximately 1.5 to 2 times greater than the first pitch P1. Each semicylindrical seating 50 (FIGS. 1 and 7) is configured to temporarily house a tubular element 12 coming from the first cylindrical member 42, while the second cylindrical member 47 is rotating. Furthermore, a guide member 46 (FIG. 7), fixed to the support structure 22, is partly disposed around the second cylindrical member 47, with the function of preventing the tubular elements 12 temporarily positioned in the semicylindrical seatings 50 from exiting the latter except when each tubular element 12, brought in rotation of the second cylindrical member 47, comes as close as possible to the deformation unit 19 (FIGS. 1 and 7), to be transferred on the latter.

The distancing unit 18 only has the function of distancing the tubular elements 12 more angularly from each other, for an easier workability thereof in the other downstream working units, i.e., in the deformation unit 19, the bending unit 20 and the packaging unit 21, where the angular distance between the tubular elements 12/straws 11, remains the same (second pitch P2), as will be described in detail below.

The greater angular distancing of the tubular elements 12 is obtained by commanding the second cylindrical member 47 to rotate at a second peripheral speed V2 which is higher than the first peripheral speed V1 of the first cylindrical member, in the ratio V2:V1=P2:P1.

The deformation unit 19 is placed immediately downstream of the distancing unit 18 and is configured to make, by deformation means known per se, or which will be developed in the future, at least one bellows 14 (FIG. 4) on each tubular element 12. The aforementioned deformation means are not described herein, because they fall outside the scope of the present invention.

Briefly, the deformation unit 19 comprises a third cylindrical member 51 rotatable in the second rotation direction S2 around a third axis of rotation X3, also substantially horizontal.

The third cylindrical member 51 has a larger external diameter than that of the second cylindrical member 47, for example in a ratio of about 1.5:1, and is rotated so that the peripheral speed V2 of the two cylindrical members 47 and 51 is the same.

The third cylindrical member 51 (FIG. 1) has a peripheral surface 56 substantially tangent to the peripheral surface 49 of the second cylindrical member 47 and suitable to support and temporarily retain the tubular elements 12, parallel to the third axis of rotation X3 and angularly equidistant from each other by the second pitch P2. To this end, the peripheral surface 56 can be provided with a plurality of retaining seatings, not depicted but structurally and functionally similar to the aforementioned retaining seatings 45, 50, or with any suitable gripping means suitable to selectively grasp or release the tubular elements 12.

Therefore, since the circumferential extension of the peripheral surface 56 is greater than that of the peripheral surface 49, on the peripheral surface 56 there are a greater number of seatings, not depicted in the drawings, to house the tubular elements 12, angularly distanced from each other by the second pitch P2.

The bending unit 20 (FIGS. 1 and 7) is configured to make, by means of bending means known per se, or which will be developed in the future, at least one bend, for example at about 180°, of each straw 11 in the forming step, in correspondence with the bellows 14 thereof (FIG. 5). The aforementioned bending means are not described herein, because they fall outside the scope of the present invention.

Briefly, the bending unit 20 comprises a fourth cylindrical member 76 (FIG. 1), substantially tangent to the third cylindrical member 51, having substantially the same external diameter as the latter and rotating in the first rotation direction S1, around a fourth axis of rotation X4, substantially horizontal. To reduce the overall dimensions of the machine 10, the fourth cylindrical member 76 is positioned above the third cylindrical member 51.

The fourth cylindrical member 76 is rotated so that it has the same peripheral speed V2 as the two cylindrical members 47 and 51.

The fourth cylindrical member 76 (FIG. 1) has a peripheral surface 79 substantially tangent to the peripheral surface 56 of the third cylindrical member 51 and suitable to support and temporarily retain the straws 11 in the forming step, parallel to the fourth axis of rotation X4 and angularly equidistant, from the adjacent straw, by the second pitch P2 (FIG. 5). To this end, the peripheral surface 79 can be provided with a plurality of retaining seatings, not depicted but structurally and functionally similar to the aforementioned retaining seatings 45, 50, or with any suitable gripping means suitable to selectively grasp or release the tubular elements 12.

The packaging unit 21 (FIGS. 1 and 7) is positioned immediately downstream of the bending unit 20 and is configured to package each straw 11 already bent and arriving from the bending unit 20, enclosing it between a first thin film 80 (FIGS. 6 and 7) and a second thin film 81, both of suitable material, for example of the transparent food type, preferably biodegradable, and coming from two corresponding rolls 82 and 83 (FIG. 7), first and second, rotatably mounted on corresponding horizontal support shafts 85 and 86 pivoted on the fixed structure 22.

The packaging unit 21 further comprises a fifth cylindrical member 87 (FIGS. 1 and 7) substantially tangent to the fourth cylindrical member 76, having a slightly smaller external diameter than the latter and rotating in the second rotation direction S2, around a fifth axis of rotation X5, substantially horizontal.

In the first embodiment, shown in FIG. 1, the fifth cylindrical member 87 is positioned above the fourth cylindrical member 76 in order to reduce the lateral dimension of the machine 10.

In the second embodiment, shown in FIG. 7, the fifth cylindrical member 87 is instead positioned laterally with respect to the fourth cylindrical member 76, on the opposite side with respect to the feed unit 16.

In both embodiments, also the fifth cylindrical member 87 is rotated at the same peripheral speed V2 as the three cylindrical members 47, 51, and 76 (FIG. 1).

In both the first and second embodiments, the fifth cylindrical member 87 has a peripheral surface 90 substantially tangent to the peripheral surface 79 of the fourth cylindrical member 76 and suitable to support and temporarily retain the finished straws 11, parallel to the fifth axis of rotation X5 and angularly equidistant, from the adjacent straw, during the packaging thereof.

With particular reference to the second embodiment illustrated in FIG. 7, on the peripheral surface 90 of the fifth cylindrical member 87 is positioned the first thin film 80 coming from the first roll 82 and guided by first return rollers 91; then on the first thin film 80 are able to be deposited the straws 11 (FIG. 6) coming from the fourth cylindrical member 76 (FIG. 7) of the bending unit 20 and then the second thin film 81 coming from the second roll 83 (FIG. 7) and guided by second return rollers 92 is able to be deposited on the straws 11 (FIG. 7).

A drawing roller 93 (FIGS. 1 and 7) is positioned in correspondence with the peripheral surface 90 of the fifth cylindrical member 87 to draw the first thin film 80 so that the latter is shaped to receive each straw 11 coming from the fourth cylindrical member 76 of the bending unit 20 immediately after.

The packaging unit 21 further comprises both first heat-welding means 94, configured to weld the two thin films 80 and 81 together transversely with respect to the advancement direction A, and second heat-welding means 97, configured to weld the two thin films 80 and 81 together in a longitudinal direction, i.e., parallel with respect to the advancement direction A (FIGS. 1 and 7). In correspondence with the second heat-welding means 97, a rotating support roller 95 is provided, configured to keep the films 80, 81 in contact with the second heat-welding means 97.

Immediately downstream of the packaging unit 21, for example in a rear compartment of the machine 10, one or more collection containers of a known type are positioned, or which will be developed in the future, and not depicted in the drawings, where the finished and individually packaged straws 11 can be automatically deposited.

The machine 10 can comprise, at least in the front part thereof, a protective cover, not depicted in the drawings, suitable to protect all the working units 16, 17, 18, 19, 20 and 21 from pollutants, or contaminants, so that each relative working step can occur in a protected and safe place.

The machine 10 can comprise one or more suitable detection means, not depicted, configured to verify the presence of the tubular elements 12 in each retaining seating of the various working units, and/or the correct performance of one or more workings, such as the formation of the bellows 14 by the deformation unit 19, or the correct bending of the straw 11 by the bending unit 20. By way of non-limiting example, the aforementioned detection means can be configured as optical devices, such as cameras or video cameras, or as presence sensors, photocells or other devices still commonly used in the industrial automation sector. In possible embodiments, the detection means are fixed to the support structure 22 in the proximity of one of the cylindrical members 42, 47, 51, 76, 87, oriented such that their field of view comprises at least one portion of the respective peripheral surfaces 41, 49, 56, 79, 90.

The operation of the machine 10 described heretofore, which also corresponds to the method for the automated production of straws 11, preferably made of paper, according to the present invention, occurs entirely in an automated manner under the control of the central control unit 29 (FIG. 7), which suitably controls all the aforementioned motor parts and the electric motor 61.

Briefly, the aforementioned method first comprises a starting step, in which all the aforementioned motor members and the electric motor 61 are actuated, so that the conveyor belt 33, the conveyor belt 39, all five cylindrical members 42, 47, 51, 76 and 87, the circular blade 60 and the support roller 95 are brought into rotation simultaneously.

Then follows a feed step, in which a plurality of tubular elements 12 (FIG. 2) is inserted into the machine 10, by means of the conveyor belt 33 (FIGS. 1 and 7), with the tubular elements 12 disposed on the latter also haphazardly, or randomly. The tubular elements 12 can be disposed on top of the conveyor belt 33 either manually, or in an automated manner, using any known technique, or which will be developed in the future.

The feed unit 16 automatically arranges in an orderly manner each tubular element 12 in a corresponding semicylindrical seating 45 of the first cylindrical member 42, distancing it by the first pitch P1 (FIG. 2) of the adjacent tubular element 12. This occurs by means of the distributor member 37 (FIGS. 1 and 7), which vertically stacks, one above the other, the various tubular elements 12 coming from the conveyor belt 33, and the conveyor belt 29 which conveys the tubular elements 12 toward the first cylindrical member 42. Here each tubular element 12 is received in a respective semicylindrical seating 45 made on the peripheral surface 41 of the first cylindrical member 42. The rotation of the latter in the first rotation direction S1, around the first axis of rotation X1, causes the tubular elements 12 to be brought in sequence, one after another, to interact with the circular blade 60 of the cutting unit 17. Due to the inclined disposition of the circular blade 60, disposed to contact an end of the tubular elements 12, the cutting unit 17 forms the pointed, or obliquely cut, end 13 on each tubular element 12.

The feed step ends with the automatic transfer of the tubular element 12 provided with the pointed end 13 from the feed unit 16 to the distancing unit 18. Such a transfer occurs with a distancing step in which the tubular element 12 automatically passes from a semicylindrical seating 45 of the first cylindrical member 42 to a semicylindrical seating 50 (FIG. 1) of the second cylindrical member 47, so that the tubular element 12 is distanced from the adjacent tubular element 12 by the second pitch P2>P1.

Should the semicylindrical seatings 45 of the first cylindrical member 42 already have a certain pitch P2, the distancing unit 18 would not be necessary and therefore there would be no corresponding distancing step.

The possible distancing step is followed by a deformation step, which begins with the automatic transfer of the tubular element 12 into the third cylindrical member 51 of the deformation unit 19, where at least one bellows 14, preferably near the end of the tubular element 12 which is opposite the pointed end 13, is automatically formed in the element 12.

The deformation step occurs in any manner known, or to be developed in the future, and is therefore not described herein.

The deformation step is followed by a bending step, in which each tubular element 12, on which both the obliquely cut end 13 and the bellows 14 have already been made, is automatically transferred to the fourth cylindrical member 76 of the bending unit 20, where a bending step of each tubular element 12 occurs in correspondence with the bellows 14 thereof, at the end of which folded straws 11 are obtained.

The bending step occurs in any manner known, or to be developed in the future, and is therefore not described herein.

At the end of the bending step the straws 11 have an overall length L2 (FIG. 5) which is less than the length L1 of the tubular element 12 from which they were obtained.

The bending step is followed by a packaging step, which begins with the automatic transfer of the straws 11 into the packaging unit 21 (FIG. 7). In particular, the straws 11 automatically pass into the fifth cylindrical member 87, on which is already located the first thin film 80 coming from the first roll 82 drawn by the drawing roller 93.

With the rotation of the fifth cylindrical member 87 the straws 11 are also brought into contact with the lower part of the second thin film 81, coming from the second roll 83. Thus, the straws 11 are sandwiched between the two thin films 80 and 81. The latter, together with the straws 11, continue toward the support roller 95 passing first under the first heat-welding means 94 and then under the second heat-welding means 97. Each straw 11 is thus individually hermetically packaged, thus it is protected before the use thereof.

The straws 11, finished and packaged, are then detached and sent automatically to the two aforementioned collection containers.

From the foregoing description it is clear that the machine 10 described thus far is very compact and that all the working steps, from the feeding of the tubular elements 12, also haphazardly, to the collection of the finished and packaged straws 11, inserted into the films 80 and 81, which hygienically protect the same straws 11 until their use, occur in total safety and automatically under the control of the central control unit 29, which can be programmed in any known manner, or which will be developed in the future.

It is clear that modifications and/or additions of parts or steps can be made to the machine 10 and to the relative method for the automated production of straws, preferably made of paper, described thus far, without departing from the scope of the present invention as defined by the claims.

It is further clear that although the present invention has been described with reference to a specific example of how the present invention can be realized, those skilled in the art will certainly be able to produce many other equivalent forms of machines and methods, having the features expressed in the claims and therefore all of which falling within the scope of protection defined thereby.

In the following claims, the reference numbers and symbols in parentheses have the sole purpose of facilitating the reading thereof and must not be considered as limiting factors as regards the scope of protection defined thereby.

The invention claimed is:

1. A machine comprising at least one feed unit configured to automatically feed a plurality of tubular elements toward a plurality of working units of said tubular elements, to make straws, wherein said plurality of working units comprises:

(i) a deformation unit, configured to make at least one bellows on each of said tubular elements so as to be present in each of said straws;

(ii) a bending unit, configured to carry out at least one bend on each of said tubular elements, in correspondence with said bellows;

(iii) a packaging unit, configured to package each of said straws, wherein said deformation unit, said bending unit and said packaging unit are disposed in sequence and without a break in continuity with respect to an advancement direction of said tubular elements, so that the packaging of said folded straws occurs without interruption after said deformation unit has made the bellows and said bending unit has carried out the bending in correspondence with said bellows, wherein said deformation unit, said bending unit and said packaging unit each comprise a cylindrical member, each of the cylindrical members being rotatable around a respective axis of rotation at a same peripheral speed, wherein said plurality of working units are disposed so that each of the cylindrical members are tangent to each other, and wherein each of the cylindrical members has a peripheral surface provided with retaining means of the straws suitable to support and temporarily retain the straws being formed, disposed parallel to said axis of rotation, and angularly equidistant, from the adjacent straw, by a determinate pitch.

2. The machine as in claim 1, wherein said packaging unit comprises a cylindrical member rotating around an axis of rotation thereof on which at least a first film is partially wrapped which is configured to receive the straws so that said straws are closed between said first thin film and a second film.

3. The machine as in claim 2, wherein said packaging unit comprises a first heat-welding means, configured to weld said two films together in a transverse direction with respect to said advancement direction, and a second heat-welding means, configured to weld said two films together in a longitudinal direction parallel to said advancement direction.

4. The machine as in claim 2, wherein said packaging unit comprises a drawing roller positioned in correspondence with a peripheral surface of said cylindrical member for drawing the first thin film so that the latter is shaped to accommodate a respective straw.

5. The machine as in claim 1, wherein between said feed unit and said plurality of working units there is a distancing unit configured to distance said tubular elements from each other and take them to said determinate constant pitch each one from the other.

6. The machine as in claim 1, wherein said feed unit comprises feed means configured to convey said plurality of tubular elements, also initially disposed haphazardly, toward a first cylindrical member rotating around a first axis of rotation thereof and provided with one or more peripheral seatings parallel to said first axis of rotation, each of which is configured to temporarily receive and retain one of said tubular elements.

7. The machine as in claim 6, wherein the machine it comprises a cutting unit, equipped with a circular blade rotating about an axis of rotation thereof configured to cut each of said tubular elements so as to create a pointed, or obliquely cut, end, on each of said straws.

8. The machine according to claim 7, wherein said cutting unit is operatively associated with said feed unit or any one of said deformation unit, said bending unit and said packaging unit.

9. The machine as in claim 7, wherein said cutting unit is disposed near said first cylindrical member, substantially on an opposite side with respect to a distributor member, in a position such that a cutting profile of said circular blade can interfere with said tubular elements retained in said peripheral seatings, and wherein said axis of rotation of said circular blade and said axis of rotation of said first cylindrical member form a determinate angle.

10. The machine as in claim 9, wherein said axis of rotation of said circular blade and said axis of rotation of said first cylindrical member form a determinate angle between 30° and 60°.

11. The machine as in claim 10, wherein said axis of rotation of said circular blade and said axis of rotation of said first cylindrical member form a determinate angle of 45°.

12. The machine as in claim 1, wherein said plurality of tubular elements is made of paper to make straws made of paper.

13. A method to produce straws, comprising a feed step in which a plurality of tubular elements are fed toward a plurality of working units configured to perform corresponding workings on each of said tubular elements, in order to make said straws, wherein said plurality of working units allow to carry out the following working steps in sequence, without a break in continuity:

(i) a deformation step, during which at least one bellows is made on each of said tubular elements so as to be present in each of said straws;

(ii) a bending step, during which at least one bending is carried out on each of said tubular elements, in correspondence with said bellows;

(iii) a packaging step, during which each of said straws is packaged in a suitable material so that each of said straws is hermetically sealed to be hygienically protected before the use thereof, so that said deformation step, said bending step and said packaging step occur one after the other without interruption while said tubular elements advance along an advancement direction-, wherein said deformation unit, said bending unit and said packaging unit each comprise a cylindrical member, each of the cylindrical member being rotatable around a respective axis of rotation at a same peripheral speed, wherein said plurality of working units are disposed so that each of the cylindrical members are tangent to each other, and wherein each of the cylindrical member has a peripheral surface provided with retaining means of the straws to support and temporarily retain the straws being formed, disposed parallel to said axis of rotation, and angularly equidistant, from the adjacent straw, by a determinate pitch.

14. The method as in claim 13, wherein between said feed step and said at least one working step there is a distancing step to distance said tubular elements from each other and take them to a determinate constant pitch each one from the other.

15. The method as in claim 13, wherein during said deformation step, said bending step and said packaging step, the straws being formed are retained by retaining means suitable to support and temporarily retain the straws, angularly equidistant from each other with respect to the adjacent one by a determinate pitch.

16. The method as in claim 13, wherein the method further comprises a cutting step, during which each of said tubular elements is cut to make a pointed, or obliquely cut, end on each of said straws and wherein said cutting step can occur before or after said deformation step, or before or after said bending step, or before said packaging step.

* * * * *